United States Patent

Iles

[15] 3,653,970

[45] Apr. 4, 1972

[54] METHOD OF COATING SOLAR CELL WITH BOROSILICATE GLASS AND RESULTANT PRODUCT

[72] Inventor: Peter Albert Iles, Arcadia, Calif.

[73] Assignee: National Aeronautics & Space Administration

[22] Filed: Apr. 30, 1969

[21] Appl. No.: 820,453

Related U.S. Application Data

[63] Continuation of Ser. No. 537,160, Mar. 24, 1966, abandoned.

[52] U.S. Cl. ........ 136/89, 117/201

[51] Int. Cl. ........ H01l 15/02, H01l 7/32

[58] Field of Search ........ 537/160; 136/89

[56] References Cited

UNITED STATES PATENTS

| | | | |
|---|---|---|---|
| 3,076,861 | 2/1963 | Samulon et al. | 136/89 |
| 3,247,428 | 4/1966 | Perri et al. | 117/201 X |
| 3,350,234 | 10/1967 | Ule | 136/89 |

*Primary Examiner*—Allen B. Curtis
*Attorney*—Earl Leroy, Neil B. Siegel and John R. Manning

[57] ABSTRACT

A lightweight protective glass coating over the radiation receiving surfaces of a solar cell is formed integrally with the cell by depositing a layer of glass particles to such surfaces and heating the cell and glass particles to an elevated temperature sufficient to fuse the glass particles and to form the coating. In another embodiment, a conventional protective glass slide is applied to the glass particles, prior to heating, and the cell, particles, and slide are heated to fuse the glass and form a fused glass bond between the cell and the slide.

18 Claims, 2 Drawing Figures

INVENTOR.
PETER ALBERT ILES
BY Lyon & Lyon
ATTORNEYS

METHOD OF COATING SOLAR CELL WITH BOROSILICATE GLASS AND RESULTANT PRODUCT

This application is a continuation of pending application Ser. No. 537,160 filed on Mar. 24, 1966, now abandoned, and entitled "Solar Cell Coating."

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435, 42 U.S.C. 2457).

This invention relates to solar cells having a coating thereon and a process for forming the coating, and more particularly to an integral and lightweight coating having high thermal emissivity for a solar cell.

Photovoltaic devices such as solar cells may be formed by diffusing a P-type impurity such as boron into a blank or wafer of N-type semiconductor, generally silicon, or by diffusing an N-type impurity such as phosphorous into a wafer of P-type semiconductor to form a P-N junction. Various characteristics, such as transparency, high thermal emissivity, low weight, and reflectivity of solar cells and coatings thereon are significant, particularly for space use. A number of approaches for providing a low reflectivity solar cell are described in copending U.S. Pat. application Ser. No. 335,336, now U.S. Pat. No. 3,361,594, entitled "Solar Cell and Process for Making the Same" filed on Jan. 2, 1964, by Peter Albert Iles and Bernd Ross, the disclosure of which is incorporated herein by reference.

Solar cells used in space missions generally carry transparent cover slides, typically ranging in thickness from 6 mils of glass to 60 mils of quartz, to provide a reasonable degree of thermal emissivity and/or to protect the cells from damage from charged particles or micrometerorites. These cover slides generally are held onto the cells by a thin adhesive layer. Not only does the adhesive layer sometimes have a poor heat transmissivity characteristic, but also usually requires that expensive ultraviolet rejection filters be evaporated onto the cover slide to prevent darkening of the adhesive layer. Additionally, thin cover slides are difficult to manufacture and apply to the solar cell and, accordingly, the typical cover slides used, as well as the adhesive, add significant weight to the cell.

According to the present invention an integral coating is formed directly on a surface of a solar cell. No adhesive is required, and one or more layers of coating may be used for providing a thin flexible cover. The coating of the present invention is integral with the cell, transparent, lightweight, and provides good thermal emissivity.

It is therefore an object of the present invention to provide a process for forming an improved coating on a solar cell.

It is another object of the present invention to provide a process for forming a lightweight and highly emitting coating on a solar cell.

It is a further object of the present invention to provide a solar cell having an integral coating which is lightweight and has good thermal emissivity.

An additional object of this invention is to provide a thin high emissivity coating for solar cells without the use of conventional adhesives.

Another object of this invention is to provide a solar cell having high temperature stability.

These and other objects and features of the present invention will become more apparent upon reference to the accompanying description and drawing in which.

Typically, solar cells for space use are formed by diffusing one type impurity into a semiconductor wafer of another type. The usual diffusion process leaves a thin glassy layer which generally is then removed by etching. The exposed surface usually is provided with an anti-reflective coating and then coated with an adhesive to which a cover slide is adhered.

According to the present invention, an integral coating or layer of dielectric, such as glass, forming a cover slide is provided without the use of an adhesive. One or more integral coatings may be applied in layers directly on the surface of a solar cell to provide a thin and flexible cover which not only is lightweight but also provides high thermal emissivity. The terms layer of dielectric or glass are used herein to include glass or glass compositions which are transparent to the radiation band of interest or other suitable coatings, such as quartz and sapphire.

In practicing a preferred embodiment of the process of the present invention, an integral glass layer is formed on a semiconductor blank, such as a solar cell blank having a P-N junction therein, by depositing a solution containing fine glass particles on the surface of the blank. The solution is dried and the remaining glass powder is fused by a short high temperature cycle. Additional coating layers may be formed in a similar manner to provide a cover of the desired thickness. Alternatively, one or more coatings may be deposited on the glass layer formed by the diffusion process of the aforementioned application, or a solid or bulk glass slide may be fused onto a previously formed glass coating, a layer of the glass coating serving as the bond for the slide.

Figure 1:
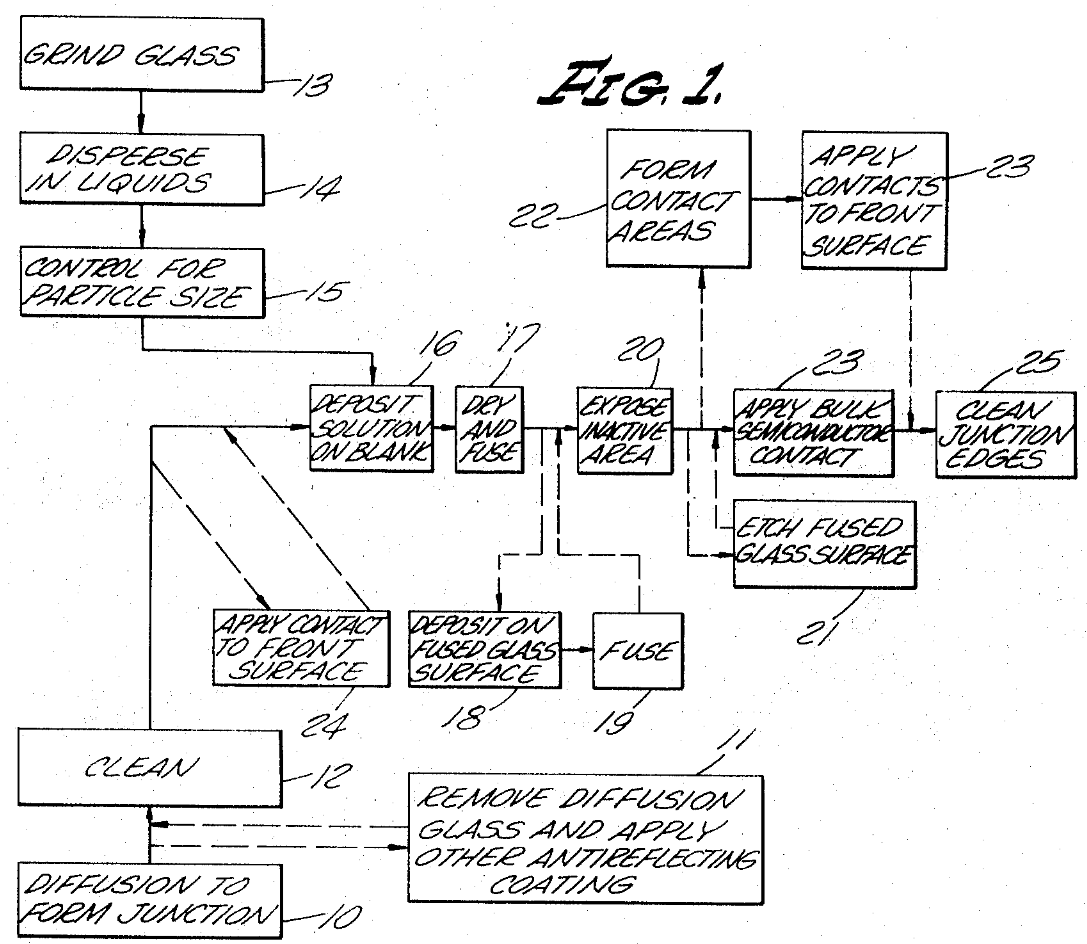
FIG. 1 is a flow diagram of a process according to the invention.

Turning now to FIG. 1, a solar cell blank is formed in a conventional manner by diffusion and cleansing as indicated by respective steps 10 through 12 of the flow diagram in FIG. 1. Either the glassy layer, such as phosphorosilicate glass, resulting from diffusion may be left as an anti-reflective coating, or this layer is removed and replaced by another anti-reflective coating such as silicon monoxide. A solution from which the coating is formed is made by grinding a suitable glass, such as a borosilicate, dispersing the resulting glass powder in an organic liquid and removing the heavier glass particles therefrom as indicated by respective steps 13 through 15. The organic liquid, for example, may be a solution of 75 milligrams per milliliter of one part isopropyl alcohol and 6 parts ethyl acetate. The heavier glass particles may be removed from the suspension by gravity sedimentation or centrifuging to leave a suitable density, such as 10 milligrams per milliliter, of glass particles.

The solution is applied to the blank thereby allowing the fine glass particles to deposit on the exposed surface thereof as indicated by step 16 in FIG. 1, followed by a drying and fusing step 17. The solution may be applied in various ways to the blank. For example, the solar cell blank may be placed in the solution and centrifuged at high speed (e.g., 3,000 rpm) to cause the fine glass powder to settle onto the blank, or the solution may be sprayed onto the blank. The fine glass powder remaining on the blank is fused by a high temperature cycle, such as 770° C. for 5 to 10 minutes or 900° C. for a few seconds. Preferably the fusing atmosphere should be inert.

Additional coating layers may be provided in a similar manner as indicated by steps 18 and 19 in FIG. 1. After the desired thickness coating is formed, the inactive surfaces, that is the surfaces which are not to receive solar radiation, may be sandblasted or etched to remove any diffused layers resulting from the diffusion step in forming the blank as indicated by step 20 in FIG. 1, and to remove any undesired glass resulting from the coating step. Preferably, the surface of the fused glass coating is etched to provide a matte finish to further improve the thermal emissivity thereof as indicated by step 21. A short dip in concentrated (approximately 49 percent, for example) hydrofluoric acid has been found sufficient for this purpose and does not cause deterioration in the electrical performance of the cell.

Suitable electrical contacts are applied through the fused glass as indicated by steps 22 and 23. These contacts may be deposited in the desired pattern through holes or slots formed in the glass coatings. The holes may be made by etching through the coating, or by removing the glass powder where required by masking or scribing the damp powder before it is fused. Contact material is then applied to the exposed surface of the wafer to form the contact pattern, and also applied to the lower surface of the cell. The contact material may be plated by electroless deposition, in which case the borosilicate glasses do not become plated and, hence, additional masking during plating is not required.

Alternatively, suitable state of the art contacts may be formed on the solar cell blank as shown by step 24 prior to deposition of the coating, with the glass coating being fused over these contacts. The coating can be removed from a portion of the contact region by etching or before fusing in order to provide an external electrical connection to the contacts. Contact material may be applied to the lower surface before or after deposition of the glass coating as desired. In the event the contacts are applied before fusing of the glass coating, suitable state of the art contacts which can withstand the glass fusing temperature and not degrade the cell are used. Titanium-silver contacts have been found suitable.

Finally the function of the solar cell is cleaned by treating the edge or edges with an etching solution such as hydrofluoric acid—nitric acid mixture, as shown by step 25. The contact regions may be left unsoldered, but if required may be soldered to complete the cell.

Figure 2:
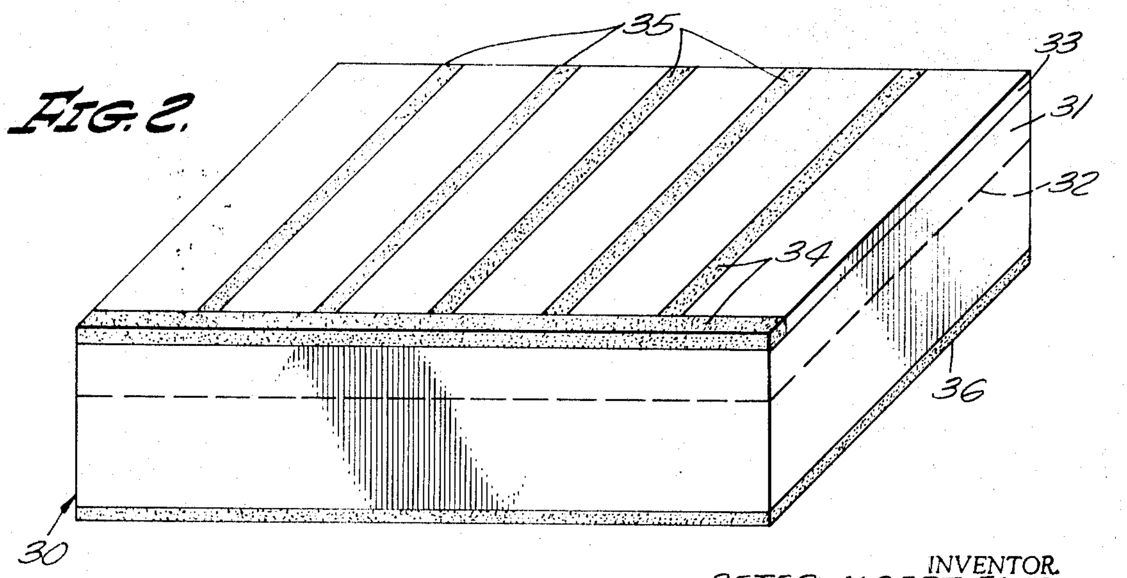
FIG. 2 is a perspective view of a solar cell according to the present invention.

FIG. 2 illustrates a solar cell constructed according to the present invention. The solar cell includes a block or wafer 30 of one type conductivity material serving as one region into which an impurity of another type conductivity has been diffused to form a surface region 31, the regions 30 and 31 being separated by a P-N junction 32. The majority of the upper radiation receiving surface of the cell is covered with an integral coating 33 formed as previously described. The remainder of the upper surface of the cell is covered by a contact strip 34 and possibly by metallic contacts or grid lines 35. The lower surface of the cell is also covered with a layer 36 of contact material. The coating 33 may be formed of plural layers which form an integral coating, with one or more layers including a contact pattern with the contact lines 35. Thus, one or more of the layers may cover the contact lines 35 if desired.

The following is an example of a process for forming a glass coating on a solar cell according to the present invention. Corning type 7070 glass (a commercially available borosilicate glass, the composition and properties of which are described, for example, on pages 27–3 and 27–4 of the *Engineering Materials Handbood*, first edition, published by McGraw-Hill Book Company, Inc. in 1958) is ground for 2 hours in a ball mill. The resulting powder is dispersed in a solution of 1 part isopropyl alcohol and 6 parts ethyl acetate to form 75 milligrams of glass per milliliter. The solution is settled or centrifuged until the density of the glass is 2 to 10 milligrams per milliliter. A cleansed phosphorous diffused P-type silicon blank preferably with a front metallic contact pattern is placed in 20 milliliters of the solution and centrifuged rapidly (approximately 3,000 rpm) to spin the glass onto the blank. The glass settles mainly on the surface of interest, but a slight residual layer may form on the other surfaces. The blank is removed from the centrifuge and dried. The glass is fused at 900° C in a furnace for 10 seconds, and may be cooled quickly if desired. A strip heater also may be used, and in either case the atmosphere preferably is inert, or substantially a vacuum. The inactive surfaces are sandblasted to remove any diffused layers of glass resulting from the diffusion step in forming the blank, or to remove any residual layers of glass resulting from the above step of deposition and fusing. The fused glass surface is washed, and if contacts were not already present during fusion, slots for contacts are etched. Contacts are plated on the front (in the slots) and back surfaces by electroless deposition of gold and nickel. The edge of the coated solar cell is etched to clear the P-N junction, followed if required by a solder dip to solder wet the contacts.

The temperature range for fusing the glass particles must be high enough to fuse the glass and not too high to cause bubbles in the resulting layer or to have an adverse effect on the semiconductor. A typical range is 750° to 950° C., with the time of application thereof ranging respectively between several minutes and several seconds. That is, the time that heat is applied for fusing the glass should be several minutes for lower temperatures, ranging to several seconds for the higher temperatures.

Thicker layers may be provided to form thicker cover slides of the same or similar glasses by forming a plurality of layers, each of which forms a bond with the next layer. Each layer effectively interfuses and fills in any gaps in the previous layer thereby forming an integral coating effectively having no interfaces between the various layers. Typically the resulting coating will range between around one-half mil and 1½ mils in thickness, but any desired thickness may be provided as long as the resulting coating has sufficient transparency for the intended use. A fused glass coating as described above having a thickness of approximately one mil provides a thermal emissivity substantially equivalent to that provided by previous bulk glass slides.

The emissivity of cells with an integral glass coating according to the invention is comparable to that or prior cells to which a bulk glass slide is affixed by an adhesive. The emissivity, which is fully described as total hemispheric emittance $e_h$, measured at 30° C. was found to be 0.90 for a lapped silicon N on P cell with a 1 to 1.5 mil integral glass coating, and better than 0.93 for a polished silicon N on P cell with a similar coating. This compares to emissivities of 0.90 and 0.94 for respective lapped and polished silicon N on P cells each with a 6 mil glass cover slide. Bare lapped and bare polished silicon N on P cells were found to have respective emissivities of 0.72 and 0.52.

Alternatively, after the contacts are formed, additional layers of glass may be formed directly on the front surface and over the metal contact pattern. Typical state of the art contact materials may be used, the primary criteria being that the contact material withstand the fusing temperature of the glass and not adversely affect the cell. The aforementioned contact material of titanium-silver is suitable.

Substantially thicker slides may be provided by fusing a bulk glass cover slide using glass to form the bond. This may be accomplished by fusing the bulk glass slide to the glass coating resulting from the diffusion step which is discussed in the aforementioned application, by settling glass particles onto the solar cell blank as described above and fusing the particles and slide in one step, or by fusing a glass layer as described above and then fusing the cover slide to the glass layer.

Although the fused glass coating has a shiny surface, a short dip in concentrated hydrofluoric acid converts the surface to a matte finish. This provides greater thermal emissivity with no deterioration in the performance of the cell.

The glass selected should closely match the semiconductor thermally. That is, both the glass and semiconductor should have the same or substantially the same coefficient of thermal expansion over the range of temperatures of concern, to eliminate adverse effects such as cracks, resulting from thermal expansion and conctraction. In the case of a solar cell, the range of temperature would be between room temperature and the glass fusing temperature. The glass should be highly transparent through the radiation band of interest. In the case of a solar cell this is the space sunlight spectrum. Additionally, the glass used should be capable of fusing into a good layer, that is, have good fusion properties when formed into a fine powder and fused. The glass should be reasonably pure, that is, contain as few components and impurities as possible to avoid radiation darkening. Radiation darkening may be determined by irradiating the completed cell, such as by bombarding the cell with electrons from a Van de Graaff accelerator. Additionally the glass should have no adverse interaction when applied to the semiconductor, such as silicon, or an antireflective coating thereof. Typical thicknesses of the glass coating may be approximately one-half to 1 mil, but may be substantially greater, such as 40 to 60 mils as long as suitable transparency for the particular use is maintained. Thick layers, such as in the neighborhood of 40 mils preferably may be provided by fusing a bulk glass slide.

Solar cells constructed in accordance with the present invention have high temperature stability. That is, they are capable of withstanding high temperatures, such as, if solderless up to 600° C. for several hours, without degradation. Prior solar cells employing an adhesive for holding a cover slide as discussed previously are limited in their temperature stability and the performance thereof tends to be degraded by exposure to elevated temperatures, such as during storage. Additionally, solar cells constructed in accordance with this invention can withstand temperature shocks and thus may be temperature cycled without significant degradation in performance. Such cells have withstood thermal shocks occasioned by sequential immersion in boiling water and liquid nitrogen without degradation in performance. Thus, such cells can withstand temperature cycling, including temperature cycling in space applications.

While the present invention has been described in terms of particular embodiments of a solar cell, it should be understood that the present embodiments are to be considered in all respects as illustrative and not restrictive, the scope of the invention being indicated by the claims rather than by the foregoing description, and all changes which come within the meaning and range of equivalency of the claims are therefore intended to be embraced thereby.

What is claimed is:

1. A process for forming an integral protective glass coating on a radiation receiving surface of a solar cell capable of producing electrical power upon being exposed to a desired band of light radiation, said cell having said radiation-receiving surface on a wafer of semiconductor material with a bulk region of a first conductivity type and a region of a second conductivity type, said regions being separated by a P-N junction, which comprises:

depositing a coating of borosilicate glass particles directly onto the radiation receiving surface of said semiconductor material, said particles being transparent to the desired radiation band, having substantially the same coefficient of thermal expansion as the semiconductor material over the desired operating temperature range, having a composition that is substantially free of components that will darken upon being exposed to said band of radiation, having substantially no adverse interaction with said semiconductor material and having a high thermal emissivity; and heating said solar cell and the glass particles to a temperature in the range of about 750° to about 950°C. for a time sufficient to fuse said particles and to thereby form a protective fused transparent glass coating on said surface that will protect the cell during exposure to said light radiation in space.

2. The process of claim 1 which further comprises etching said fused glass coating to form a matte finish thereon to increase the thermal emissivity of said cell.

3. The process of claim 1 in which the quantity of glass particles deposited on said surface produces a coating that is from about 0.5 to about 1 mil thick.

4. A process for applying a protective glass slide to the radiation-receiving surface of a solar cell capable of producing electrical power upon being exposed to a desired band of light radiation, said cell having the radiation-receiving surface on a wafer of semiconductor material with a bulk region of a first conductivity type and a region of a second conductivity type and, said regions being separated by a P-N junction, which comprises:

depositing a coating of borosilicate glass particles directly onto the radiation-receiving surface of said semiconductor material, said particles being transparent to the desired radiation band, having substantially the same coefficient of thermal expansion as the semiconductor material over the desired operating temperature range, having a composition that is substantially free of components that will darken upon being exposed to said band of radiation, having substantially no adverse interaction with said semiconductor material and having a high thermal emissivity;

applying a protective glass slide onto said deposited coating of glass particles; and heating said solar cell, the coating of glass particles, and the glass slide to a temperature in the range of about 750° to about 950° C. for a time sufficient to fuse said particles and to thereby bond the glass slide to said solar cell whereby the transparent coating of fused glass particles and the glass slide provided on said solar cell protect the cell during exposure to said light radiation in space.

5. A process for the manufacture of a glass coated solar cell capable of producing electrical power upon being exposed to a desired band of light radiation which comprises:

forming a radiation-receiving surface on a wafer of semiconductor material having a bulk region of a first conductivity type and a region of a second conductivity type, said regions being separated by a P-N junction;

depositing a coating of borosilicate glass particles directly onto the radiation-receiving surface of said semiconductor material, said particles being transparent to the desired radiation band, having substantially the same coefficient of thermal expansion as the semiconductor material over the desired operating temperature range, having a composition that is substantially free of components that will darken upon being exposed to said band of radiation, having substantially no adverse interaction with said semiconductor material and having a high thermal emissivity;

heating said solar cell and said glass particles to a temperature in the range of about 750° to about 950° C. for a time sufficient to fuse said particles and to thereby form a fused protective transparent glass coating on said surface;

removing a portion of the fused glass coating to expose a minor portion of the radiation-receiving surface;

applying metallic contacts to the exposed portion of said surface to produce a solar cell having a major portion of its radiation-receiving surface covered with the fused glass coating whereby said surface is protected during exposure to said light radiation in space.

6. A solar cell capable of producing electrical power upon being exposed to a desired band of light radiation comprising at least one radiation-receiving surface on a wafer of semiconductor material having a bulk region of a first conductivity type and a region of a second conductivity type, said regions being separated by a P-N junction; and a coating of borosilicate glass, which is transparent to the desired radiation band, has substantially the same coefficient of thermal expansion as the semiconductor material over the desired operating temperature range, has a composition that is substantially free of components that will darken upon being exposed to said band of radiation, has substantially no adverse interaction with said semiconductor material and has a high thermal emissivity, fused directly onto said radiation-receiving surface of said semiconductor material at a temperature in the range of about 750° to about 950° C. whereby said surface is protected during exposure to said light radiation in space.

7. The solar cell of claim 6 in which said glass coating has matte finish.

8. The solar cell of claim 6 in which said glass coating is about 0.5 to 1 mil thick.

9. The solar cell of claim 6 further comprising a glass slide bonded to said radiation-receiving surface by said fused glass coating.

10. A process for forming an integral protective glass coating on a radiation-receiving surface of a solar cell capable of producing electrical power upon being exposed to a desired band of light radiation, said cell having an anti-reflective coating on a wafer of semiconductor material with a bulk region of a first conductivity type and a region of a second conductivity type, said regions being separated by a P-N junction, and said radiation-receiving surface being formed by said coating, which comprises:

depositing a coating of borosilicate glass particles directly onto the radiation-receiving surface of said anit-reflective coating, said particles being transparent to the desired radiation band, having substantially the same coefficient of thermal expansion as the semiconductor material over the desired operating temperature range, having a composition that is substantially free of components that will darken upon being exposed to said band of radiation, having substantially no adverse interaction with said anti-reflective coating or said semiconductor material and having a high thermal emissivity; and heating said solar cell and the glass particles to a temperature in the range of about 750° to about 950° C. for a time sufficient to fuse said particles and to thereby form a protective fused transparent glass coating on said surface that will protect the cell during exposure to said light radiation in space.

11. The process of claim 10 which further comprises etching said fused glass coating to form a matte finish thereon to increase the thermal emissivity of said cell.

12. The process of claim 10 in which the quantity of glass particles deposited on said surface produces a coating that is from about 0.5 to about 1 mil thick.

13. A process for applying a protective glass slide to the radiation-receiving surface of a solar cell capable of producing electrical power upon being exposed to a desired band of light radiation, said cell having an anti-reflective coating on a wafer of semiconductor material with a bulk region of a first conductivity type and a region of a second conductivity type, said regions being separated by a P-N junction, and said radiation-receiving surface being formed by said coating, which comprises:

depositing a coating of borosilicate glass particles directly onto the radiation-receiving surface of said coating, said particles being transparent to the desired radiation band, having substantially the same coefficient of thermal expansion as the semiconductor material over the desired operating temperature range, having a composition that is substantially free of components that will darken upon being exposed to said band of radiation, having substantially no adverse interaction with said anti-reflective coating or said semiconductor material and having a high thermal emissivity;

applying a protective glass slide onto said deposited coating of glass particles; and heating said solar cell, the coating of glass particles and the glass slide to a temperature in the range of about 750° to about 950° C. for a time sufficient to fuse said particles and to thereby bond the glass slide to said solar cell whereby the coating of fused transparent glass particles and the glass slide provided on said solar cell protect the cell during exposure to said light radiation in space.

14. A process for the manufacture of a glass coated solar cell capable of producing electrical power upon being exposed to a desired band of light radiation which comprises:

forming a radiation-receiving surface on an anti-reflective coating on a wafer of semiconductor material having a bulk region of a first conductivity type and a region of a second conductivity type, said regions being separated by a P-N junction;

depositing a coating of borosilicate glass particles directly onto the radiation-receiving surface of said coating, said particles being transparent to the desired radiation band, having substantially the same coefficient of thermal expansion as the semiconductor material over the desired operating temperature range, having a composition that is substantially free of components that will darken upon being exposed to said band of radiation, having substantially no adverse interaction with said anti-reflective coating or said semiconductor material and having a high thermal emissivity;

heating said solar cell and said glass particles to a temperature in the range of about 750° to about 950° C. for a time sufficient to fuse said particles and to thereby form a fused protective transparent glass coating on said surface;

removing a portion of the fused glass coating to expose a minor portion of the radiation-receiving surface;

applying metallic contacts to the exposed portion of said surface to produce a solar cell having a major portion of its radiation-receiving surface covered with the fused glass coating whereby said surface is protected during exposure to said light radiation in space.

15. A solar cell capable of producing electrical power upon being exposed to a desired band of light radiation comprising at least one radiation receiving surface on an anti-reflective coating on a wafer of semiconductor material having a bulk region of a first conductivity type and a region of a second conductivity type, said regions being separated by a P-N junction; and a coating of borosilicate glass, which is transparent to the desired radiation band, has substantially the same coefficient of thermal expansion as the semiconductor material over the desired operating temperature range, has a composition that is substantially free of components that will darken upon being exposed to said band of radiation, has substantially no adverse interaction with said anti-reflective coating or said semiconductor material and has a high thermal emissivity, fused directly onto said radiation-receiving surface at a temperature in the range of about 750° to about 950° C. whereby said surface is protected during exposure to said light radiation in space.

16. The solar cell of claim 15 in which said glass coating has a matte finish.

17. The solar cell of claim 15 in which said glass coating is about 0.5 to 1 mil thick.

18. The solar cell of claim 15 further comprising a glass slide bonded to said radiation-receiving surface by said fused glass coating.

* * * * *